(12) United States Patent
Eso, Jr.

(10) Patent No.: US 10,219,635 B2
(45) Date of Patent: Mar. 5, 2019

(54) NUT DISPENSER DEVICE

(71) Applicant: Salvatore C. Eso, Jr., Monroe Township, NJ (US)

(72) Inventor: Salvatore C. Eso, Jr., Monroe Township, NJ (US)

( * ) Notice: Subject to any disclaimer, the term of this patent is extended or adjusted under 35 U.S.C. 154(b) by 0 days.

(21) Appl. No.: 15/495,742

(22) Filed: Apr. 24, 2017

(65) Prior Publication Data
US 2017/0303703 A1   Oct. 26, 2017

Related U.S. Application Data

(60) Provisional application No. 62/326,224, filed on Apr. 22, 2016.

(51) Int. Cl.
*A47F 1/03* (2006.01)
*A47G 19/34* (2006.01)
*G01F 11/18* (2006.01)
*A47F 1/035* (2006.01)

(52) U.S. Cl.
CPC ............... *A47F 1/03* (2013.01); *A47G 19/34* (2013.01); *G01F 11/18* (2013.01); *A47F 1/035* (2013.01)

(58) Field of Classification Search
CPC ......... A47G 19/34; A47G 19/32; G01F 11/18; A47F 1/035; A47F 1/02; A47F 1/03; B65G 11/026; B65G 11/166; B65G 11/186; B65G 47/34; B65G 47/44; B65G 65/23; B65G 65/24; B65G 65/34; B65G 2201/04; B65D 88/28; B65D 88/54; B65D 88/546; B65D 88/56

USPC .......................................................... 222/166
See application file for complete search history.

(56) References Cited

U.S. PATENT DOCUMENTS

| | | | | |
|---|---|---|---|---|
| 156,327 A * | 10/1874 | Bass | ..................... | B65G 11/026 193/4 |
| 163,126 A * | 5/1875 | Whiteside | ............... | A47B 11/00 193/8 |
| 436,052 A * | 9/1890 | Deming | .................. | A47F 1/035 206/39 |
| 444,745 A * | 1/1891 | Emery | .................. | B65G 11/026 193/4 |
| 813,026 A * | 2/1906 | Simering | ............... | A47G 19/34 194/300 |
| 1,083,650 A * | 1/1914 | Ashworth | ............ | B65G 11/026 193/2 R |
| 1,351,251 A * | 8/1920 | Jewell | ..................... | G01F 11/18 222/185.1 |

(Continued)

*Primary Examiner* — Patrick M. Buechner
(74) *Attorney, Agent, or Firm* — Ruth Eure

(57) ABSTRACT

A nut dispenser device for dispensing nuts is provided. The nut dispenser device comprises a hollow support structure having a top side, a bottom side, and an open front side. A nut holder housing is pivotally connected to the support structure with the nut holder housing having a back door pivotally connected to the nut holder housing near a top of the nut holder housing. A spring mechanism is positioned between the support structure and the nut holder housing with the spring mechanism biasing the nut holder housing in a generally upward direction. A nut collection base is mounted to the bottom side of the support structure. As the back door of the nut holder housing opens and the nuts are dispensed therethrough, and into the nut collection base by gravity for retrieval by the user.

18 Claims, 3 Drawing Sheets

(56) References Cited

U.S. PATENT DOCUMENTS

| | | | | |
|---|---|---|---|---|
| 1,388,198 A * | 8/1921 | Philipps | A47F 1/03 | 177/68 |
| 1,419,338 A * | 6/1922 | Wieneke | G01F 11/18 | 141/358 |
| 1,425,531 A * | 8/1922 | Mabey | A47F 1/035 | 194/251 |
| 1,453,472 A * | 5/1923 | McIntyre | A47F 1/03 | 160/329 |
| 1,511,821 A * | 10/1924 | Arado | G01F 11/18 | 222/245 |
| 1,589,082 A * | 6/1926 | Albers | B65G 47/1471 | 198/533 |
| 1,602,358 A * | 10/1926 | Getskay | A47F 1/03 | 124/50 |
| 1,646,930 A * | 10/1927 | Pike | A47F 1/03 | 141/18 |
| 1,660,284 A * | 2/1928 | Waters | A47F 1/03 | 222/173 |
| 1,668,848 A * | 5/1928 | Kenney | A47G 19/32 | 222/248 |
| 1,733,459 A * | 10/1929 | Hooper | B65G 65/24 | 414/773 |
| 1,798,711 A * | 3/1931 | States | B65G 11/026 | 193/2 R |
| 1,931,908 A * | 10/1933 | Tillotson | A47F 1/03 | 221/248 |
| 2,267,921 A * | 12/1941 | Huckfeldt | A47F 1/087 | 312/121 |
| 2,452,243 A * | 10/1948 | Johnson | B65D 88/56 | 294/68.27 |
| 2,754,998 A * | 7/1956 | Doepke | A47F 1/03 | 206/509 |
| 2,852,167 A * | 9/1958 | Lempart | A47F 1/03 | 222/307 |
| 2,873,048 A * | 2/1959 | Gear | B03C 7/04 | 193/32 |
| 2,940,642 A * | 6/1960 | Strattman | A47F 1/03 | 222/185.1 |
| 3,158,245 A * | 11/1964 | Budjinski | B65G 69/00 | 193/32 |
| 3,206,051 A * | 9/1965 | Troller | B65D 88/56 | 206/509 |
| 3,217,940 A * | 11/1965 | Fahn | F25C 5/20 | 222/183 |
| 3,966,086 A * | 6/1976 | Kelso | A47F 1/03 | 221/234 |
| 4,562,941 A * | 1/1986 | Sanfilippo | G07F 11/44 | 222/108 |
| 5,437,384 A * | 8/1995 | Farrell | B65D 19/12 | 220/1.5 |
| 5,437,393 A * | 8/1995 | Blicher | A47F 1/03 | 141/369 |
| 5,499,746 A * | 3/1996 | Berrebi | B01J 8/0015 | 222/165 |
| 5,529,221 A * | 6/1996 | Roy | A47G 19/34 | 222/181.2 |
| 5,685,460 A * | 11/1997 | Vlastuin | A47F 1/03 | 222/154 |
| 5,730,333 A * | 3/1998 | Baluk | A47F 1/03 | 222/181.3 |
| 6,340,101 B1 * | 1/2002 | van Beek | B65D 88/56 | 222/162 |
| 2003/0094465 A1* | 5/2003 | Ellis | A47F 1/03 | 222/185.1 |
| 2003/0159751 A1* | 8/2003 | Chamba | A47F 1/02 | 141/18 |
| 2003/0197039 A1* | 10/2003 | Marino | B65D 88/121 | 222/529 |
| 2005/0269366 A1* | 12/2005 | Brundick | A47F 1/03 | 222/185.1 |
| 2006/0000848 A1* | 1/2006 | Humphrey | A47F 1/02 | 221/283 |
| 2009/0289061 A1* | 11/2009 | Eyermann | A47F 1/02 | 220/23.88 |
| 2013/0048677 A1* | 2/2013 | Goulet | A47F 1/02 | 222/156 |
| 2013/0263781 A1* | 10/2013 | Redler | G01F 11/46 | 118/712 |

* cited by examiner

NUT DISPENSER DEVICE

CLAIM OF PRIORITY

This patent application claims priority under 35 USC 119 (e) (1) from U.S. Provisional Patent Application Ser. No. 62/326,224 filed Apr. 22, 2016, of common inventorship herewith entitled, "Nut Dispenser," which is incorporated herein by reference as though the same were set forth in its entirety.

FIELD OF THE INVENTION

The present invention pertains to the field of food containers, and more specifically to the field of nut dispensers.

BACKGROUND OF THE INVENTION

The snack foods market brings in almost three hundred and thirty five billion dollars globally. A big part of this market is snack nuts including almonds, cashews, pistachios, peanuts, pecans, walnuts, Brazil nuts and hazelnuts. These nuts are nutritious, delicious and tasty. They are so addictive that individuals get up from a couch or recliner again and again to return to a kitchen cupboard for just one more handful out of a can, jar or bag containing nuts.

The prior art has put forth several designs for nut dispensers. Among these are:

US Patent Publication 2011/0062190 to Scott Johnson and Ronald Brundick describes a dispensing actuator locking assembly for a bulk inventory dispenser. The dispenser comprises a housing, a lockable dispensing actuator pivotally connected to the housing, and a gate connected to the dispensing actuator. The gate is adapted to pivot between a closed position and an open position when a receptacle is properly staged beneath the dispenser. When properly staged, a receptacle urges a locking member to disengage the dispensing actuator thereby unlocking it. When the dispensing actuator is in an unlocked condition, stored inventory selectively dispenses through an opening in the housing. The dispensing actuator cannot be accidentally actuated unless and until the locking assembly is purposefully disengaged by the user of the dispenser when a receptacle is in place to catch and store the dispensed inventory.

U.S. Pat. No. 5,139,173 to Donald J. Evinger describes a bulk foodstuff dispenser with a pivotally mounted chute that dispenses product when manually depressed. A combined product ramp and chute spring takes the form of a flexible plastic plate in a product container area that engages and biases the chute upwardly to its product blocking position. When manually depressed, the chute flexes the ramp upwardly above a product stop, permitting product to flow over the stop into the chute. A chute safety lever prevents inadvertent product dispensing and is operated by the same user's hand that pushes the chute downwardly.

U.S. Pat. No. 2,852,167 to Francis S. Lempart describes a dispensing machine comprising a housing and a hopper arranged in the housing with a bottom discharge opening spaced rearwardly from the front housing wall. A chute has a receiving opening spaced below and forwardly of the hopper opening. An open top delivery container is mounted to reciprocate between a retracted position under the hopper opening and an extended position over the chute opening. A rearwardly hinged bottom on the container swings freely downward and discharges the container contents by gravity into the chute. A rearwardly extending platform means has its forward edge overhanging the rear of the chute opening for slidably supporting the container and the hinged bottom, and controlling the release of the hinged bottom from and the return to its normal container closing position upon reciprocation of the container. A rearwardly extending plate on the container is mounted at the top rear end for movement across the hopper opening to cut off the contents from the container during its forward shifting movement. A helically coiled spring extends across the forward edge of the hopper to open the path of the container and co-act with the advancing edge of the plate to obviate the crushing of hopper merchandise as it is cut off from the container by the spring and plate. The spring is disposed at a predetermined distance to the rear of the forward edge of said platform whereby the plate fully closes the hopper discharge opening a predetermined interval in advance of the release of the hinged bottom by the forward edge of the platform.

None of these prior art references describe the present invention.

SUMMARY OF THE INVENTION

It is an object of the present invention to provide an attractive hand driven, table top container and dispenser for all varieties of snack nuts.

The present invention is a nut dispenser device for dispensing nuts. The nut dispenser device comprises a hollow support structure having a top side, a bottom side, and an open front side. A nut holder housing is pivotally connected to the support structure with the nut holder housing having a back door pivotally connected to the nut holder housing near a top of the nut holder housing. A spring mechanism is positioned between the support structure and the nut holder housing with the spring mechanism biasing the nut holder housing in a generally upward direction. A nut collection base is mounted to the bottom side of the support structure. As the back door of the nut holder housing opens and the nuts are dispensed therethrough, and into the nut collection base by gravity for retrieval by the user.

In addition, the present invention is a method for dispensing nuts. The method comprises providing a hollow support structure having a top side, a bottom side, and an open front side, pivotally securing a lever arm to the support structure nearingly adjacent a top side of the support structure, mounting a nut holder housing to the lever arm, pivotally connecting a back door to the nut housing holder near a top of the nut holder housing, positioning a spring mechanism between the support structure and the nut holder housing, biasing the nut holder housing in a generally upward direction, mounting a nut collection base to the bottom side of the support structure, positioning a diagonally directed chute between the nut holder housing and the nut collection base, opening the back door of the nut holder housing, dispensing the nuts therethrough, and feeding the nuts into the nut collection base for retrieval by the user.

The present invention further includes a nut dispenser device for dispensing nuts. The nut dispenser device comprises a hollow support structure having a top side, a bottom side, and an open front side. A lever arm is pivotally secured to the support structure nearingly adjacent a top side of the support structure. A nut holder housing is mounted to the lever arm with the nut holder housing having a back door pivotally connected to the nut holder housing near a top of the nut holder housing. A spring mechanism is positioned between the support structure and the nut holder housing with the spring mechanism biases the nut holder housing in a generally upward direction. A knob release mechanism is slidably mounted to the support structure with the knob release mechanism having a knob and a shaft extending from the knob. The shaft is releasably receivable within an aperture formed in the lever arm for maintaining the lever arm in a down position and for maintaining the back door of the nut holder housing in a closed position. A nut collection base is mounted to the bottom side of the support structure. A diagonally directed chute is positioned between the nut holder housing and the nut collection base. Upon sliding the knob release mechanism outward and pulling the shaft from the aperture in the lever arm, the bias of the spring causes the lever arm and the nut holder housing to move in a generally upward direction thereby opening the back door of the nut holder housing and allowing the nuts to exit the nut holder housing, travel down the chute by force of gravity, and land in the nut collection tray.

DETAILED DESCRIPTION OF THE INVENTION

Figure 1:
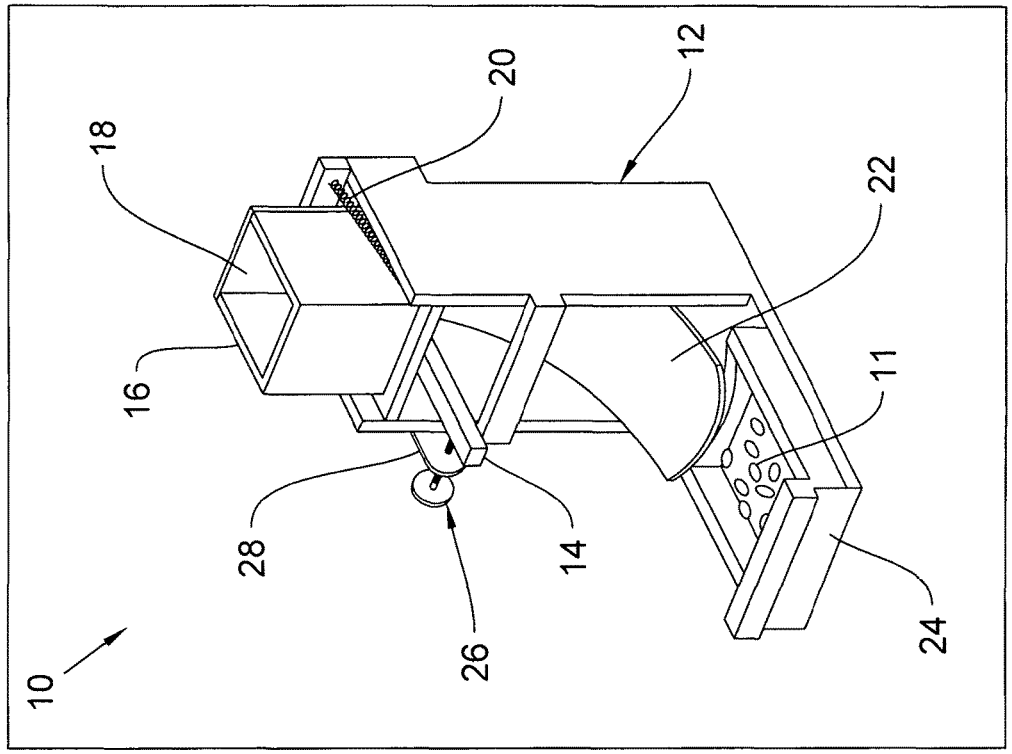
FIG. 1 is a perspective view illustrating a nut dispenser device, constructed in accordance with the present invention, showing a knob release mechanism manipulated to release a spring-biased nut holder housing in a generally backward direction to open a door and dispense nuts into a tray for catching dispensed nuts.
Figure 2:
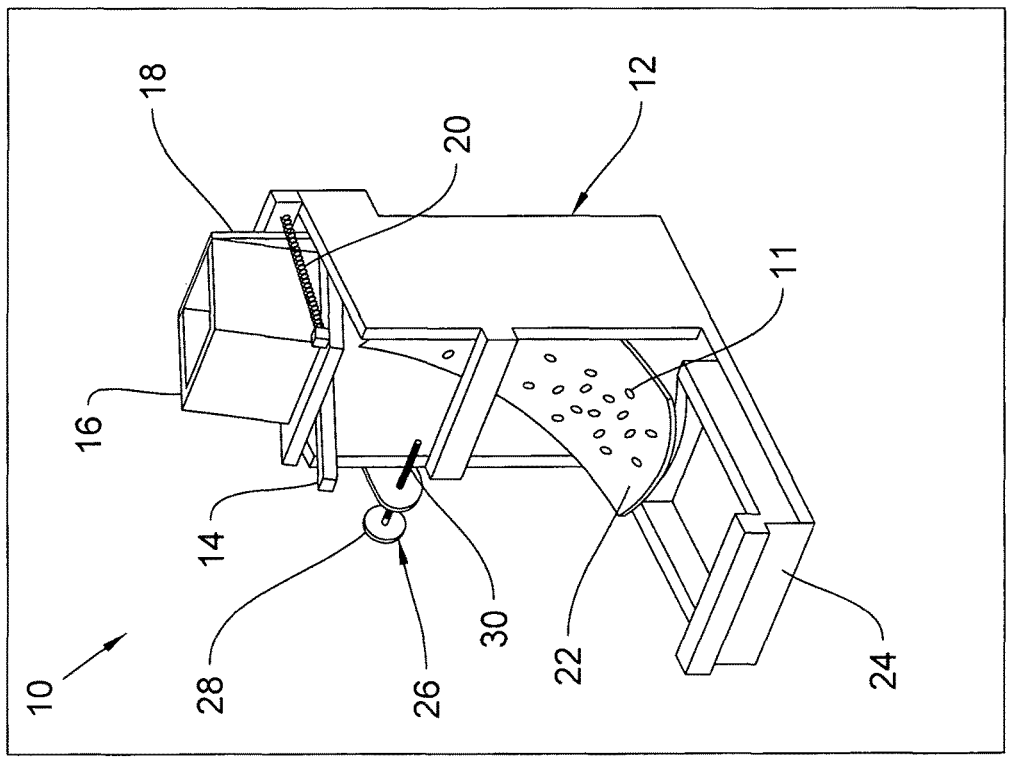
FIG. 2 is a perspective view illustrating the nut dispenser device, constructed in accordance with the present invention, showing the knob release mechanism releasably securing the nut holder housing in its non-dispensing position against the bias of the spring member with the door in a closed position thereby maintaining the nuts in the nut holder housing.
Figure 3:
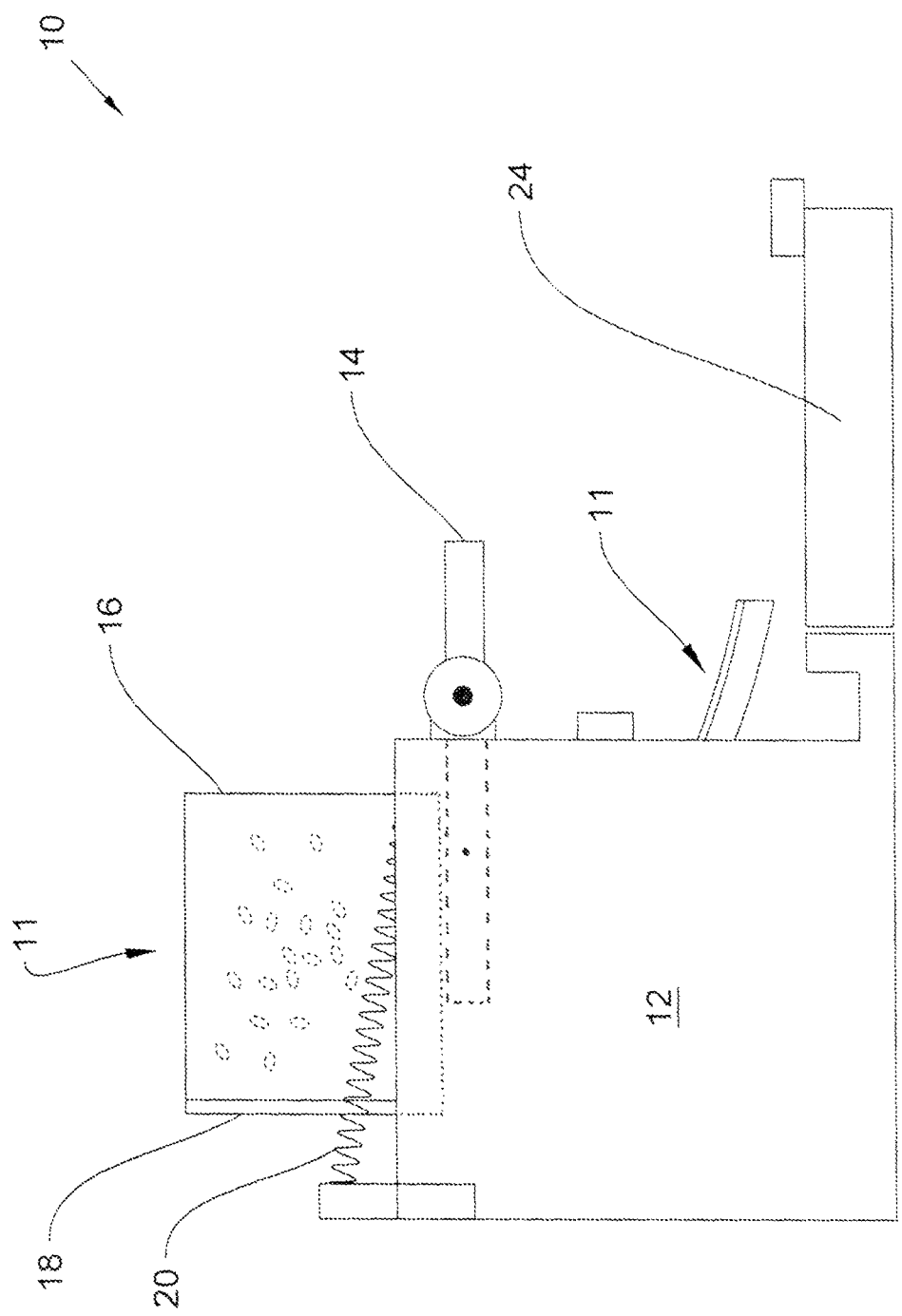
FIG. 3 is a sectional elevational view illustrating the nut dispenser device, constructed in accordance with the present invention.
Figure 4:
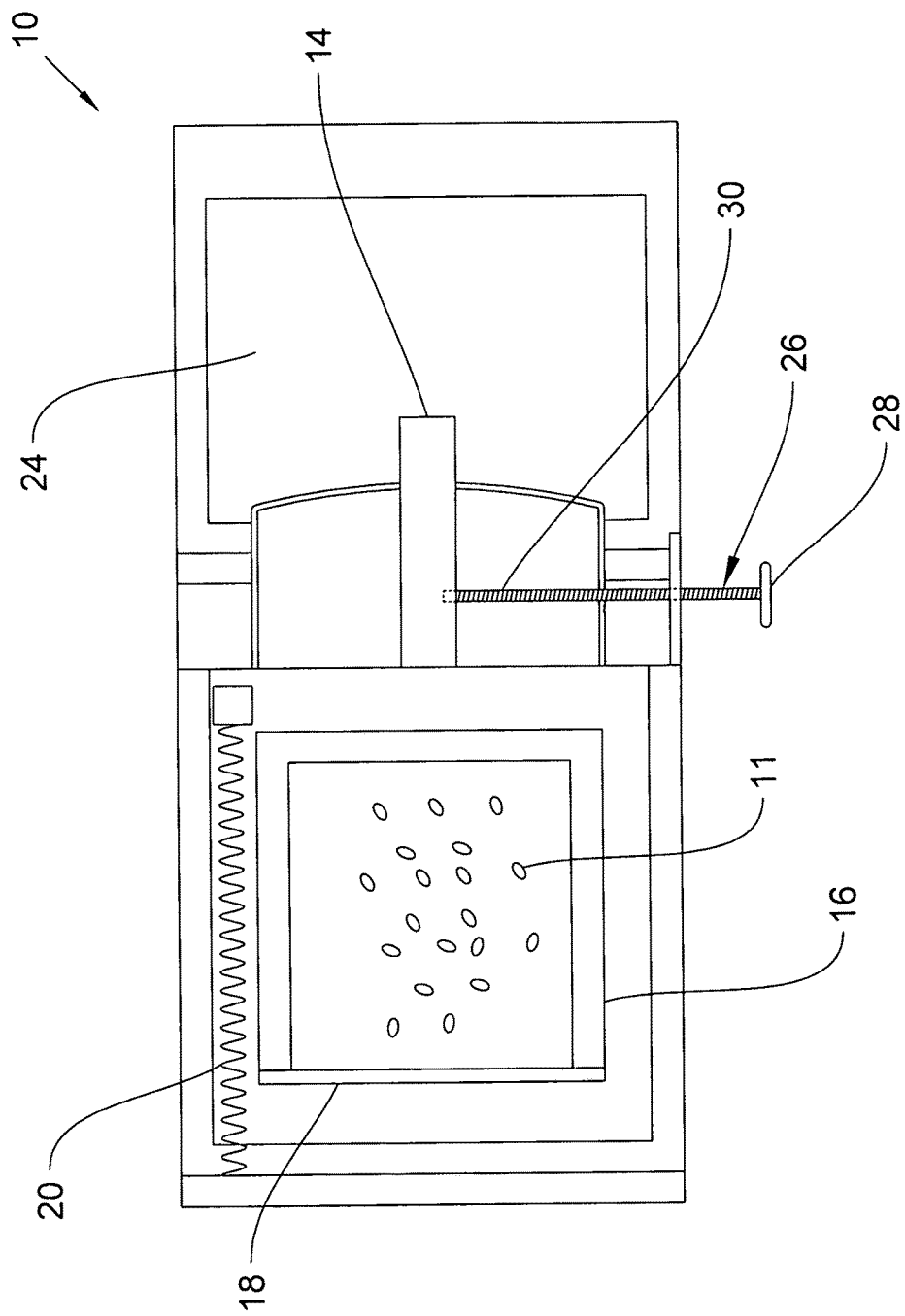
FIG. 4 is a top plan view illustrating the nut dispenser device, constructed in accordance with the present invention.

The present invention, hereinafter referred to as a nut dispenser device, indicated generally at 10, is an attractive hand driven, table top container and dispenser for all varieties of snack nuts 11. Dispensing a serving of nuts 11 by a pull of a spring lock handle, the Nut Dispenser Device 10 saves users from having to measure out a serving or repeatedly returning to their kitchen for another handful. Conveniently placed on a coffee table, bar top, countertop or other surface, the nut dispenser device 10 effectively stores and dispenses nuts 11, making a nutritious and delicious snack favorite immediately accessible to snack eaters. It should be noted that the Nut Dispenser Device 10 can dispense a variety of nuts 11 and should not be limited to the type of nuts 11 capable of being dispensed.

The Nut Dispenser Device 10 of the present invention is preferably constructed from a food grade molded thermoplastic in a variety of colors or constructed from a thin gauge polished aluminum or stainless steel material. The table top embodiment of the Nut Dispenser Device 10 preferably stands approximately twelve and three quarter inches in height from base to top, eleven inches in width from side to side, and thirteen inches in depth from front to back.

The Nut Dispenser Device 10 of the present invention includes a hollow support structure 12 having a top side, a bottom side, and an open front side. A lever arm 14 is pivotally secured to the support structure nearingly adjacent the top side of the support structure 12. The lever arm 14 preferably extends beyond the open front side of the support structure 12 allowing a user to easily grasp and manipulate the lever arm 14 to dispense the nuts 11, as will be described in further detail below.

In addition, the Nut Dispenser Device 10 of the present invention includes a nut holder housing 16 sized and shaped for holding a plurality of nuts 11. The nut holder housing 16 is mounted to the lever arm 14 such that movement of the lever arm 14 in a generally upward or downward direction also moves the nut holder housing 16 in the same direction. It should be noted that the nut holder housing 16 can either be open-topped or have a cover lid, depending on the desires of the user and manufacturer.

The nut holder housing 16 of the Nut Dispenser Device 10 of the present invention includes a back door 18 pivotally connected to the nut holder housing 16 near the top of the nut holder housing 16. Basically, the back door 18 is pivotably openable when the nut holder housing 16 is moved in a generally upward direction by the lever arm 14. In operation, as the lever arm 14 is moved in a generally upward, a bottom of the back door 18 of the nut holder housing 16 opens allowing nuts 11 within the nut holder housing 16 to exit the nut holder housing 16 through the opened back door 18.

The Nut Dispenser Device 10 of the present invention additionally includes a spring mechanism 20 positioned between the support structure 12 and the nut holder housing 16. The spring mechanism 20 biases the nut holder housing 16, and thus the lever arm 14, in a generally upward direction.

The Nut Dispenser Device 10 of the present invention further includes a diagonally directed chute 22 or apron positioned between the nut holder housing 16 and a nut collection base 24. The nut collection base 24 is mounted to the bottom side of the support structure 12. As the back door 18 of the nut holder housing 16 opens and the nuts 11 are dispensed therethrough, the nuts 11 contact the chute 22 and travel down the chute 22, by gravity, and into the nut collection base 24 for retrieval by the user.

Furthermore, the Nut Dispenser Device 10 of the present invention includes a knob release mechanism 26 having a knob 28 and a shaft 30 extending from the knob 28. The shaft 30 is releasably receivable within an aperture formed in the lever arm 14 for maintaining the lever arm 14 in a down position and the back door 18 of the nut holder housing 16 in a closed position. Sliding the knob release mechanism 26 outward and pulling the shaft 30 from the aperture in the lever arm 14, the bias of the spring 20 causes the lever arm 14 and the nut holder housing 16 to move in a generally upward direction thereby opening the back door 18 of the nut holder housing 16 and allowing the nuts 11 to exit the nut holder housing 16, travel down the chute 22 by force of gravity, and land in the nut collection tray 24. The user can determined the amount of nuts 11 collected in the nut collection tray 24 by moving the lever arm 14 in a general downward direction to close the back door 18 of the nut holder housing 16.

To use the Nut Dispenser Device 10 of the present invention, a user simply fills the nut holder housing 16 with snack nuts 11 of their choice and then pulls the knob release mechanism 26 to fill the nut collection tray 24 as often as desired to enjoy eating their favorite nut 11. The Nut Dispenser Device 10 functions effectively and efficiently in dispensing snack nuts 11. The Nut Dispenser Device 10 conveniently delivers personal portions of these delicious snack foods from a tabletop, bar, or countertop. Durably constructed of premium quality materials, the Nut Dispenser Device 10 will withstand many years of continued use and enjoyment.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A nut dispenser device for dispensing nuts, the nut dispenser device comprising:
    a hollow support structure having a top side, a bottom side, and an open front side;
    a nut holder housing pivotally connected to the support structure, the nut holder housing having a back door pivotally connected to the nut holder housing near a top of the nut holder housing;
    a spring mechanism positioned between the support structure and the nut holder housing, the spring mechanism biases the nut holder housing in a generally upward direction; and
    a nut collection base mounted to the bottom side of the support structure;
    wherein as the back door of the nut holder housing opens and the nuts are dispensed therethrough, and into the nut collection base by gravity for retrieval by the user.

2. The nut dispenser device of claim 1 wherein a lever arm extends beyond the open front side of the support structure.

3. The nut dispenser device of claim 1 wherein movement of a lever arm in an upward or downward direction also moves the nut holder housing in the same direction.

4. The nut dispenser device of claim 1 wherein the nut holder housing is open-topped.

5. The nut dispenser device of claim 1 wherein the back door pivotably opens when the nut holder housing is moved in an upward direction by a lever arm such that as the lever arm is moved in an upward direction, a bottom of the back door of the nut holder housing opens allowing nuts within the nut holder housing to exit the nut holder housing through the opened back door.

6. The nut dispenser device of claim 1 and further comprising:
    a lever arm pivotally secured to the support structure nearingly adjacent a top side of the support structure;
    wherein the nut holder housing is resting on the lever arm.

7. The nut dispenser device of claim 6 and further comprising:
    a knob release mechanism slidably mounted to the support structure, the knob release mechanism having a knob and a shaft extending from the knob, the shaft being releasably receivable within an aperture formed in the lever arm for maintaining the lever arm in a down position and for maintaining the back door of the nut holder housing in a closed position;
    wherein sliding the knob release mechanism outward and pulling the shaft from the aperture in the lever arm, the bias of the spring causes the lever arm and the nut holder housing to move in an upward direction thereby opening the back door of the nut holder housing and allowing a chute by force of gravity, and land in a nut collection tray.

8. The nut dispenser device of claim 6 wherein the amount of nuts dispensed is determined by moving the lever arm in a downward direction to close the back door of the nut holder housing.

9. The nut dispenser device of claim 1 and further comprising:
    a diagonally directed chute positioned between the nut holder housing and the nut collection base;
    wherein the nuts contact the chute, travel down the chute, by gravity, and into the nut collection base for retrieval by a user.

10. The nut dispenser device of claim 1 wherein the nut holder housing, a chute and a nut collection tray are constructed from a food grade molded thermoplastic in any of a variety of colors or constructed from a thin gauge polished aluminum or stainless steel material.

11. A method for dispensing nuts, the method comprising:
    providing a hollow support structure having a top side, a bottom side, and an open front side;
    pivotally securing a lever arm to the support structure nearingly adjacent a top side of the support structure;
    a nut holder housing resting on the lever arm;
    pivotally connecting a back door to the nut housing holder near a top of the nut holder housing;
    positioning a spring mechanism between the support structure and the nut holder housing;
    biasing the nut holder housing in an upward direction;
    mounting a nut collection base to the bottom side of the support structure;
    positioning a diagonally directed chute between the nut holder housing and the nut collection base;
    opening the back door of the nut holder housing;
    dispensing the nuts therethrough; and
    feeding the nuts into the nut collection base for retrieval by a user.

12. A nut dispenser device for dispensing nuts, the nut dispenser device comprising:
    a hollow support structure having a top side, a bottom side, and an open front side;
    a lever arm pivotally secured to the support structure nearingly adjacent a top side of the support structure;
    a nut holder housing resting on the lever arm, the nut holder housing having a back door pivotally connected to the nut holder housing near a top of the nut holder housing;
    a spring mechanism positioned between the support structure and the nut holder housing, the spring mechanism biasing the nut holder housing in an upward direction;
    a knob release mechanism slidably mounted to the support structure, the knob release mechanism having a knob and a shaft extending from the knob, the shaft being releasably receivable within an aperture formed in the lever arm for maintaining the lever arm in a down position and for maintaining the back door of the nut holder housing in a closed position;
    a nut collection base mounted to the bottom side of the support structure; and
    a diagonally directed chute positioned between the nut holder housing and the nut collection base;
    wherein sliding the knob release mechanism outward and pulling the shaft from the aperture in the lever arm, the bias of the spring causes the lever arm and the nut holder housing to move in a generally upward direction thereby opening the back door of the nut holder housing and allowing the nuts to exit the nut holder housing, travel down the chute by force of gravity, and land in a nut collection tray.

13. The nut dispenser device of claim 12 wherein the lever arm extends beyond the open front side of the support structure.

14. The nut dispenser device of claim 12 wherein movement of the lever arm in an upward or downward direction also moves the nut holder housing in the same direction.

15. The nut dispenser device of claim 12 wherein the nut holder housing is open-topped.

16. The nut dispenser device of claim 12 wherein the back door pivotably opens when the nut holder housing is moved in an upward direction by the lever arm such that as the lever arm is moved in a generally upward, a bottom of the back door of the nut holder housing opens allowing nuts within the nut holder housing to exit the nut holder housing through the opened back door.

17. The nut dispenser device of claim 12 wherein the amount of nuts dispensed is determined by moving the lever arm in a downward direction to close the back door of the nut holder housing.

18. The nut dispenser device of claim 12 wherein the nut holder housing, the chute and the nut collection tray are constructed from a food grade molded thermoplastic in any of a variety of colors or constructed from a thin gauge polished aluminum or stainless steel material.

\* \* \* \* \*